(12) United States Patent
Angelidaki et al.

(10) Patent No.: US 10,550,021 B2
(45) Date of Patent: Feb. 4, 2020

(54) SYSTEM AND METHOD TO CONTROL $H_2O_2$ LEVEL IN ADVANCED OXIDATION PROCESSES

(71) Applicant: Danmarks Tekniske Universitet, Kgs. Lyngby (DK)

(72) Inventors: Irini Angelidaki, Copenhagen (DK); Yifeng Zhang, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 58 days.

(21) Appl. No.: 15/521,846

(22) PCT Filed: Oct. 27, 2015

(86) PCT No.: PCT/EP2015/074886
§ 371 (c)(1),
(2) Date: Apr. 25, 2017

(87) PCT Pub. No.: WO2016/066648
PCT Pub. Date: May 6, 2016

(65) Prior Publication Data
US 2017/0247273 A1 Aug. 31, 2017

(30) Foreign Application Priority Data
Oct. 27, 2014 (EP) .................................. 14190480

(51) Int. Cl.
*C02F 3/00* (2006.01)
*C02F 1/467* (2006.01)
(Continued)

(52) U.S. Cl.
CPC ............ *C02F 3/005* (2013.01); *C02F 1/4672* (2013.01); *C25B 1/30* (2013.01); *H01M 8/16* (2013.01);
(Continued)

(58) Field of Classification Search
None
See application file for complete search history.

(56) References Cited

U.S. PATENT DOCUMENTS

| | | | | | |
|---|---|---|---|---|---|
| 5,958,208 | A | * | 9/1999 | Thiele | ..................... C25B 1/285 205/471 |
| 2005/0048334 | A1 | * | 3/2005 | Sridhar | ............. H01M 8/04201 429/418 |
| 2011/0318610 | A1 | | 12/2011 | Rabaey | |

FOREIGN PATENT DOCUMENTS

| | | |
|---|---|---|
| CN | 103359824 A | 10/2013 |
| WO | WO 2011/069192 A1 | 6/2011 |
| WO | WO 2012/054629 A2 | 4/2012 |

OTHER PUBLICATIONS

Yamada, Yusuke et al—Hydrogen peroxide as sustainable fuel: electrocatalysts for production with a solar cell and decomposition with a fuel cell—ChemComm, 2010 (Year: 2010).*

(Continued)

*Primary Examiner* — Bradley R Spies
(74) *Attorney, Agent, or Firm* — Knobbe Martens Olson & Bear LLP

(57) ABSTRACT

The present invention relates to a bio-electrochemical system (BES) and a method of in-situ production and removal of $H_2O_2$ using such a bio-electrochemical system (BES). Further, the invention relates to a method for in-situ control of $H_2O_2$ content in an aqueous system of advanced oxidation processes (AOPs) involving in-situ generation of hydroxyl radical (OH) by using such a bio-electrochemical system (BES) and to a method for treatment of wastewater and water disinfection. The bio-electrochemical system (BES) according to the invention comprises:
an aqueous cathode compartment comprising a first cathode and a second cathode,
an aqueous anode compartment comprising an anode at least partly covered in biofilm, wherein the first cathode (Continued)

is connected to a first circuit and the second cathode is connected to a second circuit, wherein the first and the second circuit are connected to the system by an external switch.

12 Claims, 3 Drawing Sheets

(51) Int. Cl.
  *H01M 8/16* (2006.01)
  *C25B 1/30* (2006.01)
(52) U.S. Cl.
  CPC .... *C02F 2303/18* (2013.01); *C02F 2305/023* (2013.01)

(56) References Cited

OTHER PUBLICATIONS

Alkire, Richard C. et al., "Electrocatalysis: Theoretical Foundations and Model Experiments" Series: Advances in Electrochemical Sciences and Engineering—vol. 14, 2013.

Fu, Lei et al., "Synthesis of hydrogen peroxide in microbial fuel cell" J Chem Technol Biotechnol, 2010, pp. 715-719, vol. 85.

Glaze, William H. et al., "The Chemistry of Water Treatment Processes Involving Ozone, Hydrogen Peroxide and Ultraviolet Radiation" Ozone Science & Engineering, 1987, pp. 335-352, vol. 9.

Kiely, Patrick D. et al., "Anode microbial communities produced by changing from microbial fuel cell to microbial electrolysis cell operation using two different wastewaters" Bioresource Technology, 2011, pp. 388-394, vol. 102.

Modin, Oskar et al., "Development and testing of bioelectrochemical reactors converting wastewater organics into hydrogen peroxide" Water Science & Technology, 2012, pp. 831-836, vol. 66.

Rozendai, René A. et al., "Efficient hydrogen peroxide generation from organic matter in a bioelectrochemical system" Electrochemistry Communications, 2009, pp. 1752-1755, vol. 11.

Sun, Min et al., "An MEC-MFC-Coupled System for Biohydrogen Production from Acetate" Environ. Sci. Technol., 2008, pp. 8095-8100, vol. 42.

Tartakovsky, B. et al., "A Comparison of Air and Hydrogen Peroxide Oxygenated Microbial Fuel Cell Reactors" Biotechnol. Prog., 2006, pp. 241-246, vol. 22.

Wu, Tingting "A New Method for Removal of Hydrogen Peroxide Interference in the Analysis of Chemical Oxygen Demand" Environmental Science & Technology, 2012, pp. 2291-2298, vol. 46.

You, Shi-Jie et al., "Sustainable Conversion of Glucose into Hydrogen Peroxide in a Solid Polymer Electrolyte Microbial Fuel Cell" ChemSusChem, 2010, pp. 334-338, vol. 3.

Zhang, Yifeng et al., "Generation of Electricity and Analysis of Microbial Communities in Wheat Straw Biomass-Powered Microbial Fuel Cells" Applied and Environmental Microbiology, Jun. 2009, pp. 3389-3395, vol. 75, No. 11.

Zhang, Yifeng et al., "A new method for in situ nitrate removal from groundwater using submerged microbial desalination—denitrification cell (SMDDC)" Water Research, 2013, pp. 1827-1836, vol. 47.

Zhu, Xiuping et al., "Using single-chamber microbial fuel cells as renewable power sources of electro-Fenton reactors for organic pollutant treatment" Journal of Hazardous Materials, 2013, pp. 198-203, vol. 252-253.

International Search Report for PCT/EP2015/074886 dated Jan. 25, 2016.

\* cited by examiner

SYSTEM AND METHOD TO CONTROL H₂O₂ LEVEL IN ADVANCED OXIDATION PROCESSES

CROSS REFERENCE TO RELATED APPLICATIONS

This application is a U.S. National Phase Application of PCT International Application Number PCT/EP2015/074886, filed on Oct. 27, 2015, designating the United States of America and published in the English language, which is an International Application of and claims the benefit of priority to European Patent Application No. 14190480.5, filed on Oct. 27, 2014. The disclosures of the above-referenced applications are hereby expressly incorporated by reference in their entireties.

FIELD OF THE INVENTION

The present invention relates to a bio-electrochemical system (BES) and a method of in-situ production and removal of $H_2O_2$ using such a bio-electrochemical system (BES). Further, the invention relates to a method for in-situ control of $H_2O_2$ content in an aqueous system of advanced oxidation processes (AOPs) involving in-situ generation of hydroxyl radical (OH) by using such a bio-electrochemical system (BES) and to a method for treatment of wastewater.

BACKGROUND OF THE INVENTION

Advanced oxidation processes (AOPs) refers to a set of chemical treatment procedures designed to remove organic and sometimes inorganic materials in water and wastewater by oxidation through reactions with hydroxyl radicals (.OH).

AOPs rely on in-situ production of highly reactive hydroxyl radicals (.OH). Hydroxyl radicals are very strong oxidants that can be applied in treatment of water and they can oxidize any compound present in the water matrix, often at a diffusion controlled reaction speed. Consequently, .OH reacts unselectively once formed and contaminants will be quickly and efficiently fragmented and converted into small inorganic molecules. Hydroxyl radicals are produced with the help of one or more primary oxidants (e.g. ozone, hydrogen peroxide, oxygen) and/or energy sources (e.g. ultraviolet light) or catalysts (e.g. titanium dioxide). The present invention applies use of hydrogen peroxide ($H_2O_2$) for providing hydroxyl radicals.

In general, when applied in properly tuned conditions, AOPs can reduce the concentration of a contaminant from several hundred ppm to less than 5 ppb and therefore significantly reduce COD and TOC.

The AOP procedure is particularly useful for cleaning biologically toxic or non-degradable materials such as aromatics, pesticides, petroleum constituents, and volatile organic compounds in wastewater. Additionally, AOPs can be used to treat effluent of secondary treated wastewater which is then called tertiary treatment. The contaminant materials are converted to a large extent into stable inorganic compounds such as water, carbon dioxide and salts, i.e. they undergo mineralization. A goal of the wastewater purification by means of AOP procedures is the reduction of chemical contaminants and toxicity to such an extent that the cleaned wastewater may be reintroduced into receiving streams or, at least, into a conventional sewage treatment. More recently, AOPs (e.g., Fenton reaction) have also been used for disinfection of water containing bacteria, fungal and viruses (Gosselin, F., Madeira, L. M., Juhna, T. and Block, J. C. (2013). "Drinking water and biofilm disinfection by Fenton-like reaction", Water Research 47 (15): 5631-5638).

Although oxidation processes involving .OH have been in use since late 19th century (such as in Fenton reagent), the utilization of such oxidative species in water treatment did not receive adequate attention until Glaze et al. (Glaze, William; Kang, Joon-Wun; Chapin, Douglas H. (1987). "The Chemistry of Water Treatment Processes Involving Ozone, Hydrogen Peroxide and Ultraviolet Radiation.". *Ozone: Science & Engineering: The Journal of the International Ozone Association* 9 (4): 335-352) suggested the possible generation of .OH "in sufficient quantity to affect water purification" and defined the term "Advanced Oxidation Processes" for the first time in 1987. AOPs high oxidative capability and efficiency make AOPs an often used technique in tertiary treatment in which the most recalcitrant organic and inorganic contaminants are to be eliminated. The increasing interest in water reuse and more stringent regulations regarding water pollution are currently accelerating the implementation of AOPs at full-scale.

Production of $H_2O_2$:

In recent years, Fenton process which involves the in-situ generation of hydroxyl radical (OH.) has provided efficient methods for treatment of recalcitrant organic pollutants. However, the technology is suffering several challenges, among which $H_2O_2$ supply and removal of residual $H_2O_2$ are two key issues associated with commercial application.

$H_2O_2$ as a source of hydroxyl radical (OH.) is often produced through the anthraquinone oxidation and subsequently supplied by dosing in Fenton process, which have inherent problems related to inefficiency and security (See: T. T. Wu and J. D. Englehardt, *Environmental Science & Technology*, 2012, 46, 2291-2298; S.-J. You, J.-Y. Wang, N.-Q. Ren, X.-H. Wang and J.-N. Zhang, *Chemsuschem*, 2010, 3, 334-338). Efforts have been made to develop sustainable, efficient and cost-effective $H_2O_2$ production technologies.

Electro-Fenton process was developed to in-situ generate $H_2O_2$, but the electric energy consumption is relatively high.

Recently, bio-electrochemical systems (BESs) including Microbial electrolysis cells (MECs) and Microbial Fuel cells (MFCs) have been found to be promising as an alternative method for H2O2 production. Microbial Electrolysis Cell (MEC) generates hydrogen or methane from organic material by applying an electric current. The processes require noble-metal-free cathode such as graphite to achieve two-electron reaction [Eq.(1)] and avoid further oxidation of $H_2O_2$ (See: L. Fu, S.-J. You, F.-I. Yang, M.-m. Gao, X.-h. Fang and G.-q. Zhang, *Journal of Chemical Technology and Biotechnology*, 2010, 85, 715-719). The integration of MFCs and Fenton process is called Bioelectro-Fenton and has also been found to provide several advantages over the conventional processes. Nevertheless, the $H_2O_2$ production rate of MFCs reported so far is much lower than the expected level with respect to the treatment performance, which may hamper its practical application (See: R. A. Rozendal, E. Leone, J. Keller and K. Rabaey, *Electrochemistry Communications*, 2009, 11, 1752-1755; O. Modin and K. Fukushi, *Water Science and Technology*, 2012, 66, 831-836):

$$O_2 + 2e^- + 2H^+ \rightarrow H_2O_2 \quad (E=+0.450\ V_{SCE}) \qquad (1)$$

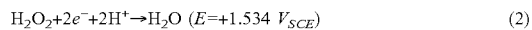

$$H_2O_2 + 2e^- + 2H^+ \rightarrow H_2O \quad (E=+1.534\ V_{SCE}) \qquad (2)$$

Reduction of $H_2O_2$:

After the Fenton process a residual amount of $H_2O_2$ is unavoidable and the residue may cause problems e.g. by causing errors in measurements of biochemical oxygen demand (BOD) and chemical oxygen demand (COD), which measurements are used to establish the content—and reduction—of organic material, or by effecting bacteria activity during subsequent biological treatment.

In lab-scale studies, the content of residual $H_2O_2$ reaches from less than 1 mM up to several tens of mM (See: T. T. Wu and J. D. Englehardt, *Environmental Science & Technology*, 2012, 46, 2291-2298). The residue $H_2O_2$ can be account for 70-80% of the $H_2O_2$ dose (molar levels) in typical full-scale installation.

Several chemical and physical methods have been developed to remove residual $H_2O_2$ or eliminate its interference on COD measurement. However, most of these methods are inefficient, e.g. the methods need additional resources in form of either chemicals or energy such as heating or high pressure, or there is a risk of secondary pollution or the methods might be difficult to monitor.

Thus, an alternative method for removing residual $H_2O_2$ in a cost-effective, efficient and environment-friendly way is required.

MFCs are found to fit the requirement very well due to its inherent advantages in anode oxidation and cathode reduction. It is known that $H_2O_2$ can be an alternative electron acceptor to oxygen in the Pt-catalyzed cathode of MFCs, where $H_2O_2$ is reduced to water [Eq.(2)] (See: B. Tartakovsky and S. R. Guiot, *Biotechnol Prog*, 2006, 22, 241-246). MFCs could be an ideal technology to remove residual $H_2O_2$ as use of MFCs requires no extra chemicals or energy, instead, electricity production is accomplished and electricity production could be considered to be an indicator of the level of residual $H_2O_2$.

The Invention:

Compared to MFCs, MECs require a small amount of electricity supply (0.2-0.8 V), but the $H_2O_2$ production rate is one to two orders of magnitude higher. Therefore, MECs is considered to be a more suitable partner for Fenton process in view of $H_2O_2$ production capacity. No report of MECs based Bioelectro-Fenton system has been available so far.

In order to save electric energy spent on MECs, a renewable and alternative power source is required. MFCs has been used to power MECs for hydrogen production (Sun, M.; Sheng, G. P.; Zhang, L.; Xia, C. R.; Mu, Z. X.; Liu, X. W.; Wang, H. L.; Yu, H. Q.; Qi, R.; Yu, T.; Yang, M., *An MEC-MFC-coupled system for biohydrogen production from acetate. Environ Sci Technol* 2008, 42, (21), 8095-100). Thus, MFCs therefore also power the MECs for $H_2O_2$ production. Furthermore, the concept of using a MFC to remove residual $H_2O_2$ from a Fenton process has never been proposed.

The invention therefore relates to a new Bioelectro-Fenton system consisting of both MEC and MFC circuits. In the system of the invention the $H_2O_2$ level in the system could be easily controlled by alternately switching between the MEC circuit which is used for $H_2O_2$ production and the MFC circuit which is used for removal of residual $H_2O_2$.

SUMMARY OF THE INVENTION

The present invention was made in view of the prior art described above, and the object of the present invention is to provide a system and a method which is able to both produce hydrogen peroxide from a chamber under some conditions and remove hydrogen peroxide from the same chamber under different conditions.

To solve the problem, the present invention provides a system providing two circuits having a common cathode chamber wherein two circuits can be activated independently.

The invention relates to a bio-electrochemical system (BES) comprising
an aqueous cathode compartment comprising a first cathode and a second cathode,
an aqueous anode compartment comprising an anode at least partly covered in biofilm, wherein the first cathode is connected to a first circuit and the second cathode is connected to a second circuit, wherein the first and the second circuit are connected to the system by an external switch.

According to an embodiment of the system, the cathode compartment and the anode compartment are separated by a bipolar membrane.

According to an embodiment of the system, the first circuit comprises a microbial electrolysis cell (MEC) mode, and the second circuit comprises a microbial fuel cell (MFC) mode.

According to an embodiment of the system, the first cathode is constituted of a graphite plate cathode and the second cathode is constituted of a Pt or other catalysts-coated cathode.

According to an embodiment of the system, the anode is constituted of carbon fibre or another carbon electrode material or stainless steel.

According to an embodiment of the system, the first circuit comprises a microbial fuel cell (MFC) comprising an anode. The MFC serves as a power source.

According to an embodiment of the system, the second circuit comprises an external resistor.

According to another aspect of the invention, the invention relates to a method of in-situ production and removal of $H_2O_2$, comprising; providing a bio-electrochemical system (BES) comprising an aqueous cathode compartment comprising a first cathode and a second cathode, and an aqueous anode compartment comprising an anode at least partly covered in biofilm; the first cathode is connected to a first circuit and the second cathode is connected to a second circuit and the two circuits are connected by an external switch, wherein applying voltage by a MFC to the first cathode leads to $H_2O_2$ production and producing electricity over the external resistor with the second cathode leads to $H_2O_2$ removal.

According to an embodiment of the method, the first circuit comprises a microbial fuel cell (MFC).

According to an embodiment of the system, the second circuit comprises a resistor.

In a further embodiment, the system comprises a further anode compartment (third compartment). The further anode compartment provides energy to the advanced oxidation process taking place in the cathode compartment. The further anode compartment may be connected to the anode compartment (first compartment) via a proton exchange membrane and a carbon electrode in form of a membrane electrode assembly (MEA) which functions as the membrane and cathode of the further anode compartment (third compartment). Alternatively, another energy source, preferably a source of renewable energy such as e.g. solar energy or wind energy (electricity) is connected to the cathode compartment.

As disclosed herein, the system of the present invention may be used for treating water containing recalcitrant organic pollutants. Accordingly, one aspect of the present invention relates to the use of the system of the present invention for treating water containing organic pollutants.

One example of water containing recalcitrant organic pollutants is wastewater. The term wastewater commonly refers to used water from any combination of domestic, industrial, commercial or agricultural activities, surface runoff/storm water, and any sewer inflow/infiltration. Thus, wastewater is generally understood as any water that has been adversely affected in quality by anthropogenic influence.

The system of the present invention may for example by used in a ballast water management. Ballasting water is well known for being contaminated with organic pollutants such as oils.

Likewise, the system may be used for treating water containing organic pollutants present in surface water. Surface water is a common source of water supply to domestic use, such as drinking water. Pollutants may be directly or indirectly introduced in a lake or water reservoir due to domestic, industrial, commercial or agricultural activities in the proximity of the lake or water reservoir. The organic pollutants caused by anthropogenic activities may be introduced via different routes, such as a river, stream, creek, brook, rivulet, rill, draining canal or surface runoff leading water polluted with organic pollutants into the lake or water reservoir. The system of the present invention may be used to improve the quality of surface water intended for use in domestic applications, such as drinking water.

The system may also be used to organic pollutants from groundwater, which has been polluted with pollutants, e.g. such as pesticides introduced in the groundwater with wastewater, e.g. in the form runoff from crops in agricultural areas. Likewise, the system may be used to or reduce the concentration of organic pollutants in leachate, which is generally referred to as any liquid material that drains from land or stockpiled material and contains significantly elevated concentrations of undesirable material, in particular organic pollutants, derived from the material that it has passed through. Landfill leachate is one of the main sources of groundwater and surface water pollution.

The method of the invention as defined above may be used for treatment of wastewater. Thus, one aspect of the invention relates a method for treating water containing organic pollutants using the system of the present invention. The method of the invention as defined above may also be used for disinfection of water containing bacteria, fungal and viruses.

The method of the invention as defined above might be used for controlling the $H_2O_2$ level in an Advanced Oxidation Process.

DETAILED DESCRIPTION OF THE INVENTION

The system performance in terms of pollutant treatment, $H_2O_2$ generation and residual $H_2O_2$ removal has been investigated.

The Bioelectro-Fenton system according to the invention is capable of both $H_2O_2$ generation and residual $H_2O_2$ removal and the new system offers a method for treating water containing recalcitrant organic pollutants in a sustainable way and therefore makes it possible to reuse wastewater.

Figure 1:
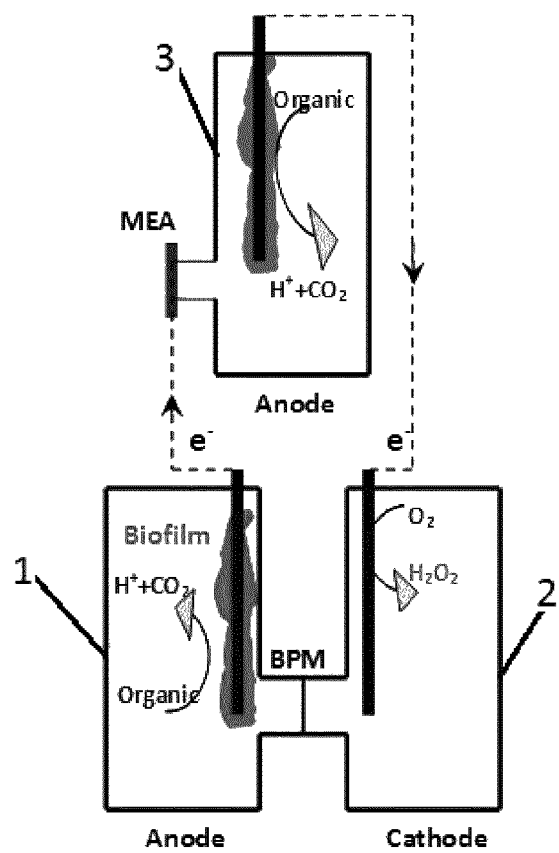
FIG. 1 shows a circuit for $H_2O_2$ production comprising a microbial electrolysis cell (MEC)

FIG. 1 shows a first circuit system comprising two chambers, an anode chamber 1 and a cathode chamber 2 the chambers are separated by a bipolar membrane (BPM). Microorganisms having bioelectro-chemical activity such as bacteria are present in the anode chamber, and organic material is added to the anode chamber in order to provide feed material for the microorganisms which then decompose the organic material to $H^+$, electrons and $CO_2$. Electrons are transferred to the cathode compartment through an external electric circuit. The bipolar membrane provides water dissociation and H+ ions travel to the cathode whereas OH— ions travel to the anode.

When organic material and air is added to the anode chamber, then an advanced oxidation process (AOP) will take place in the cathode chamber:

$$O_2 + 2e^- + 2H^+ \rightarrow H_2O_2 \quad (1)$$

The system of FIG. 1 comprises a third chamber 3 which in the shown embodiment is a further anode chamber, which is a typical single chamber MFC. This further anode chamber provides energy to the advanced oxidation process taking place in the cathode chamber and can e.g. be replaced with another energy source, preferably a source of renewable energy such as e.g. solar energy or wind energy (electricity). The third chamber 3 is connected to the first chamber 1 via a proton exchange membrane and a carbon electrode in form of a membrane electrode assembly (MEA) which server as the membrane and cathode of the third chamber 3.

Figure 2:
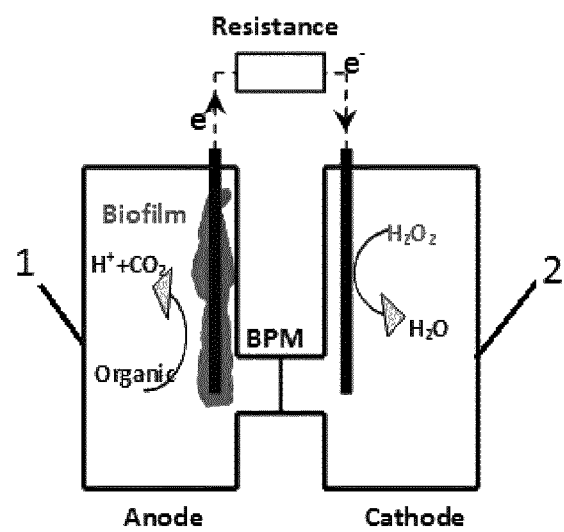
FIG. 2 shows a circuit for $H_2O_2$ removal comprising a microbial fuel cell (MFC)

FIG. 2 shows a second circuit system comprising two chambers, an anode chamber 1 and a cathode chamber 2, the chambers are separated by a bipolar membrane (BMP). The anode is connected to the cathode through an external resistor.

In this second circuit the following process takes place:

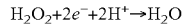

The cathode acts as electron acceptor for electrons produced by the reaction in the anode chamber.

Figure 3:
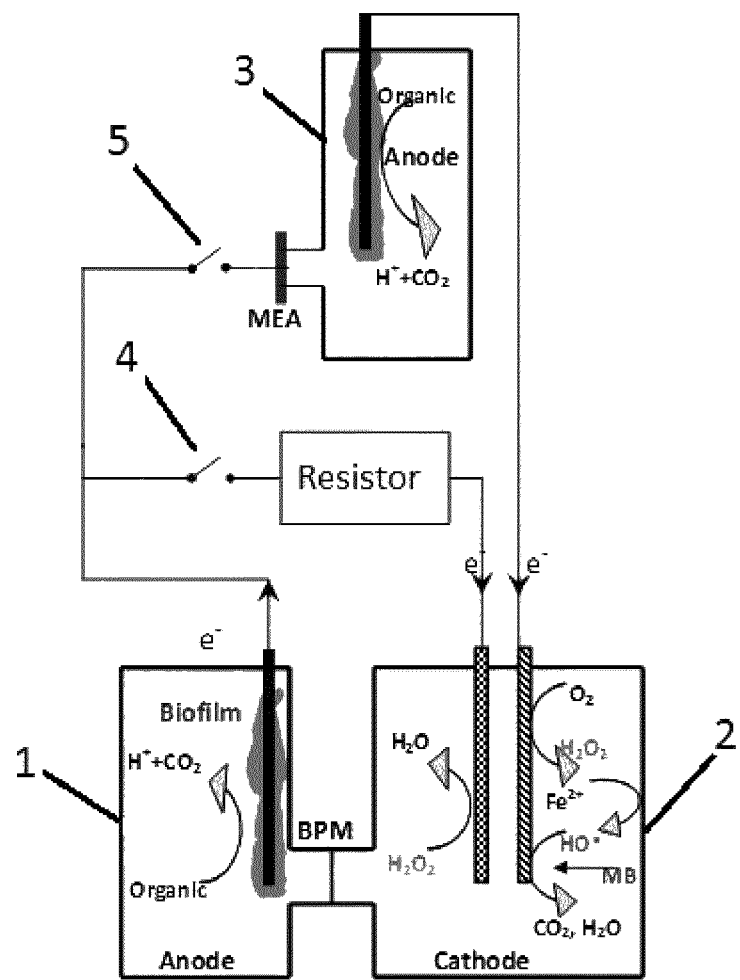
FIG. 3 shows a bio-electrochemical system (BES) including a circuit for $H_2O_2$ production and a circuit for $H_2O_2$ removal.

FIG. 3 shows a combined system according to the invention where both the first and the second circuits exist and where the first and the second circuits are joined so that the two circuits can be activated alternately i.e. first the first circuit is activated and the second circuit is disrupted, then the first circuit is disrupted and the second circuit activated. The combined system only comprises a single cathode chamber normally provided with two cathodes of different material.

Reactor Setup and Operation

The following experiments were carried out in a Bioelectro-Fenton system as shown in FIG. 3. This system comprises a H-type two-chamber BES consisted of two chambers 1 and 2 separated by a bipolar membrane (BMP) (diameter 15 mm, FuMA-Tech GmbH, Germany), which was constructed as described in: Y. Zhang, B. Min, L. Huang and I. Angelidaki, *Appl Environ Microbiol*, 2009, 75, 3389-3395.

The total volume and the working volume of each chamber of the two-chamber BES were 300 and 250 mL, respectively. The anode of chamber 1 was made of a carbon fiber brush (5.9 cm diameter, 6.9 cm length, Mill-Rose, USA), which was pretreated at 450° C. for 30 min and then pre-cultivated with mature biofilm in an MFC reactor before transferring to the BES reactor.

A graphite plate (projected surface area of 50 cm$^2$) and a piece of carbon paper with a 0.5 mg-Pt cm$^{-2}$ catalyst layer (projected surface area of 50 cm$^2$) were both used as cathode of chamber 3. The distance between the anode and cathode electrodes was approximately 5 cm. A single-chamber air cathode MFC was constructed in chamber 3 based on the anode chamber of the H-type two-chamber BES. The anode electrode of chamber 3 was the same as that used in the two-chamber BES i.e. chamber 1. The Pt coated carbon paper working as cathode was hot pressed together with a proton exchange membrane as a membrane electrode assembly (MEA, 15 mm diameter). Electrical connections and pretreatment of electrodes were done as previously described in Y. Zhang and I. Angelidaki, *Water Research*, 2013, 47, 1827-1836 which is hereby incorporated by reference.

The two-chamber BES was operated alternately in two different modes i.e. MEC mode and MFC mode, by switching the external circuits. The two-chamber BES is in MEC mode when a switch 5 is connected and a switch 4 is disconnected whereas the two-chamber BES is in MFC mode when the switch 5 is disconnected and the switch 4 is connected.

In the MEC mode, the anode and the graphite plate cathode of the two-chamber BES is connected to the cathode and anode of the single-chamber MFC which served as power source to the former. The Pt-coated cathode was disconnected from the circuit. The anode chambers i.e. chamber 1 and 3 of both reactors was continuously fed with acetate modified domestic wastewater (1 g-COD/L, pH 7.8, conductivity 2.5 mS/cm) at a hydraulic retention time (HRT) of 8 h. The feeding was designed to avoid substrate limitation on anode performance. Methylene blue (MB), which is a common dye widely used for dyeing and printing, was used as model pollutant for this study. The cathode chamber 2 of the two-chamber BES was batch fed with synthetic wastewater containing 50 mg/L MB and 0.1 M $Na_2SO_4$, and the cathode pH was adjusted to 1.5, 3, 4, 5 or 7 using 0.5 M $H_2SO_4$ and 0.5 M NaOH.

$Fe^{2+}$ was added to the cathode chamber 2 at an initial concentration of 2 mmol/L.

The whole system was operated at an external resistance of 5 Ω, unless stated otherwise.

The cathode solution was continuously purged with air.

In the MFC mode, the anode and the Pt-coated cathode of the two-chamber BES was connected to the external resistor (5 Ω), while the single-chamber MFC and the graphite cathode were disconnected from the external circuit.

Meanwhile, the aeration was stopped in the cathode chamber of the two-chamber BES. In general, the whole system was first operated in MEC mode to produce $H_2O_2$ by the Fenton-process, and then switched to MFC mode for removal of residual $H_2O_2$.

Control reactors were also setup and operated under the conditions specialized in following sections.

All experiments were carried out in duplicate at room temperature (25±5° C.).

Chemical, Electrochemical Analysis and Calculations

The concentration of MB was determined by UV-vis spectrophotometry (Spectronic 20D-F, Thermo Scientific) at 665 nm. $H_2O_2$ concentration was determined using the ceric sulfate titration method. Chemical oxygen demand (COD) was measured according to Standard Method. Total organic carbon (TOC) analysis was carried out with TOC Shimadzu TOC 5000 A. pH was measured with a PHM 210 pH meter (Radiometer).

The voltage (V) across on the external resistor was monitored with 30 min intervals using a digital multimeter (Model 2700, Keithley Instruments, Inc., Cleveland, Ohio, USA). Current (I), power (P=IV) and Coulombic efficiency (CE) were calculated as previously described. Current or power density was calculated based both on the projected surface area of cathode.

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

EXAMPLES

The FIGS. 4-7 illustrate the performance of the above exemplified system.

Figure 4:
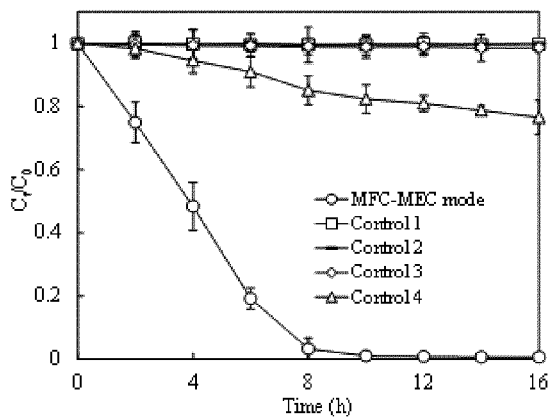
FIG. 4 shows the gradual decolourization kinetics of the methylene blue (MB) contaminated wastewater in the MEC circuit (or called MFC-MEC mode). Control 1: Open circuit. Control 2: No aeration at cathode. Control 3: No $Fe^{2+}$ addition at the cathode. Control 4: replace of MFC power supply with 5 Ω resistor without change of cathode in the MEC circuit. Operation conditions: external resistance of 5 Ω (ohm); initial MB concentration of 50 mg/L; $Fe^{2+}$ concentration of 2 mmol/L; pH of 3.0.

FIG. 4 shows the gradual decolourization ($C_T/C_0$—MB concentration at time T/MB concentration at time 0) kinetics of the methylene blue (MB) contaminated wastewater in the MEC circuit (called MFC-MEC mode). The system is set up to only operate in $H_2O_2$ production mode, i.e. switch 5 is connected during all 16 hours of the experiment.

The operation conditions during these experiments are as follows: external resistance of 5 Ω; initial MB concentration of 50 mg/L; $Fe^{2+}$ concentration in cathode chamber: 2 mmol/L; pH in cathode chamber of 3.0.

In order to evaluate different parameters influence on the process 4 control experiments are conducted:

Control 1: Open circuit, this means that the anode and cathode were disconnected from both circuits (Switch 4 and 5 were not closed).

Control 2: No aeration at cathode i.e. the cathode chamber is closed, so no air or aeration is supplied to the cathode.

Control 3: No $Fe^{2+}$ addition at the cathode i.e. the system does not operate with a Fenton process.

Control 4: replace of MFC power supply with 5 Ω resistor without change of cathode in the MEC circuit.

The result indicates that the invented system can successfully in-situ generate $H_2O_2$ for an AOP such as Fenton process oxidizing the organic matters in the wastewaters.

Figure 5:
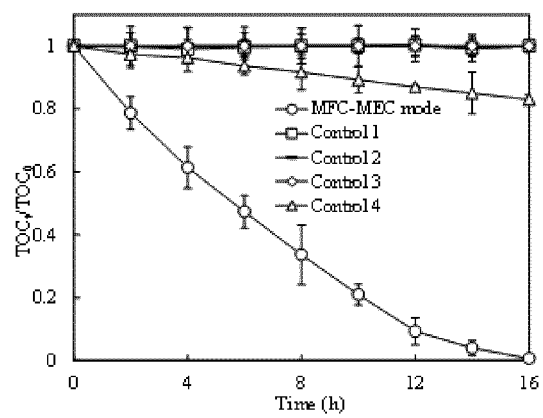
FIG. 5 shows the gradual mineralization kinetics of the methylene blue (MB) contaminated wastewater in the MEC circuit (or called MFC-MEC mode). Control 1: Open circuit. Control 2: No aeration at cathode. Control 3: no $Fe^{2+}$ addition at the cathode. Control 4: replace of MFC power supply with 5 Ω resistor without change of cathode in the MEC circuit. Operation conditions: external resistance of 5 Ω (ohm); initial MB concentration of 50 mg/L; $Fe^{2+}$ concentration of 2 mmol/L; pH of 3.0.

FIG. 5 shows the gradual mineralization kinetics of the methylene blue (MB) contaminated wastewater in the MEC circuit (or called MFC-MEC mode). Control 1: Open circuit. Control 2: No aeration at cathode. Control 3: no $Fe^{2+}$ addition at the cathode. Control 4: replace of MFC power supply with 5 Ω resistor without change of cathode in the MEC circuit. Operation conditions: external resistance of 5 Ω; initial MB concentration of 50 mg/L; $Fe^{2+}$ concentration of 2 mmol/L; pH of 3.0.

Figure 6:
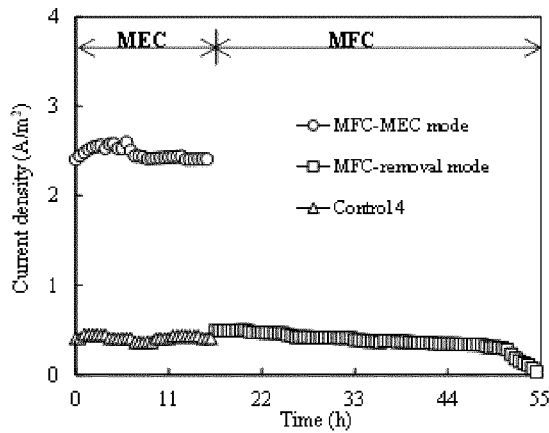
FIG. 6 shows the current density generation in the MEC circuit (or called MFC-MEC mode) and MFC circuit (or named MFC-removal mode). Control 4: replace of MFC power supply with 5 Ω resistor without change of cathode in the MEC circuit. Operation conditions: external resistance of 5 Ω (ohm); initial MB concentration of 50 mg/L; $Fe^{2+}$ concentration of 2 mmol/L; pH of 3.0.

FIG. 6 shows the current density generation in the MEC circuit (or called MFC-MEC mode) and MFC circuit (or named MFC-removal mode). Control 4: replace of MFC power supply with 5 Ω resistor without change of cathode in the MEC circuit. Operation conditions: external resistance of 5 Ω; initial MB concentration of 50 mg/L; $Fe^{2+}$ concentration of 2 mmol/L; pH of 3.0.

Figure 7:
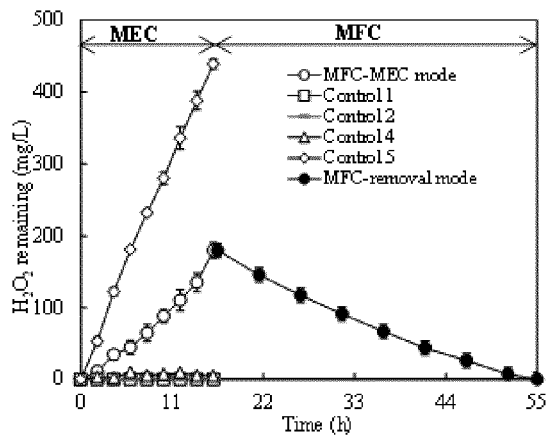
FIG. 7 shows the change of $H_2O_2$ concentration in the MEC circuit (or called MFC-MEC mode) and MFC circuit (or named MFC-removal mode). Control 1: Open circuit. Control 2: No aeration at cathode. Control 4: replace of MFC power supply with 5 Ω resistor without change of cathode in the MEC circuit. Control 5: No $Fe^{2+}$ and MB addition. Operation conditions: external resistance of 5 Ω (ohm); initial MB concentration of 50 mg/L; $Fe^{2+}$ concentration of 2 mmol/L; pH of 3.0.

FIG. 7 shows the change of $H_2O_2$ concentration in the MEC circuit (called MFC-MEC mode) and MFC circuit (called MFC-removal mode). Control 1: Open circuit. Control 2: No aeration at cathode. Control 4: replace of MFC power supply with 5 Ω resistor without change of cathode in the MEC circuit. Control 5: No $Fe^{2+}$ and MB addition. Operation conditions: external resistance of 5 Ω); initial MB concentration of 50 mg/L; $Fe^{2+}$ concentration of 2 mmol/L; pH of 3.0.

The invention claimed is:

1. A bio-electrochemical system (BES) comprising
   an aqueous cathode compartment comprising a first cathode and a second cathode,
   an aqueous anode compartment comprising an anode, which is at least partly covered in a biofilm,
   wherein the first cathode is connected to a first circuit and the second cathode is connected to a second circuit, and wherein the first and the second circuits are connected to the system by an external switch,
   wherein the first circuit comprises a microbial electrolysis cell (MEC) mode, and the second circuit comprises a microbial fuel cell (MFC) mode.

2. The bio-electrochemical system (BES) of claim 1; wherein the cathode compartment and the anode compartment are separated by a bipolar membrane.

3. The bio-electrochemical system (BES) according to claim 1, wherein the first cathode comprises a graphite plate cathode and the second cathode comprises a Pt catalyst-coated cathode or a cathode coated with another catalyst.

4. The bio-electrochemical system (BES) according to claim 1, wherein the anode comprises carbon fibre, a carbon electrode material, or stainless steel.

5. The bio-electrochemical system (BES) according to claim 1, wherein the first circuit comprises a microbial fuel cell (MFC) comprising a second anode.

6. The bio-electrochemical system (BES) according to claim 1, wherein the second circuit comprises an external resistor.

7. A method of in-situ production and removal of $H_2O_2$, comprising:
   providing a bio-electrochemical system (BES) comprising an aqueous cathode compartment comprising a first cathode and a second cathode, and an aqueous anode compartment comprising an anode, which is at least partly covered in biofilm; wherein the first cathode is connected to a first circuit and the second cathode is connected to a second circuit, and wherein the two circuits are connected by an external switch;
   applying voltage from a microbial fuel cell (MFC) to the first cathode, which induces $H_2O_2$ production; and
   producing electricity over an external resistor with the second cathode, which induces $H_2O_2$ removal.

8. The method according to claim 7, wherein the first circuit comprises the microbial fuel cell (MFC).

9. The method according to claim 7, wherein the second circuit comprises a resistor.

10. A method for treating wastewater comprising:
    contacting wastewater with a bio-electrochemical system (BES) comprising an aqueous cathode compartment comprising a first cathode and a second cathode, and an aqueous anode compartment comprising an anode, which is at least partly covered in biofilm; wherein the first cathode is connected to a first circuit and the second cathode is connected to a second circuit and, wherein the two circuits are connected by an external switch,
    applying voltage from a microbial fuel cell (MFC) to the first cathode, which induces $H_2O_2$ production; and
    producing electricity over an external resistor with the second cathode, which induces $H_2O_2$ removal from said waste water.

11. A method for controlling the $H_2O_2$ level in an Advanced Oxidation Process comprising:
    contacting a liquid in an Advanced Oxidation Process with a bio-electrochemical system (BES) comprising an aqueous cathode compartment comprising a first cathode and a second cathode, and an aqueous anode compartment comprising an anode, which is at least partly covered in biofilm; wherein the first cathode is connected to a first circuit and the second cathode is connected to a second circuit and, wherein the two circuits are connected by an external switch,
    applying voltage from a microbial fuel cell (MFC) to the first cathode, which induces $H_2O_2$ production; and
    producing electricity over an external resistor with the second cathode, which induces $H_2O_2$ removal from said liquid.

12. The bio-electrochemical system (BES) of claim 1, wherein air is supplied to said cathode chamber.

* * * * *